(12) United States Patent
Hariharasubrahmanian et al.

(10) Patent No.: US 10,681,106 B2
(45) Date of Patent: Jun. 9, 2020

(54) ENTROPY SHARING ACROSS MULTIPLE COMPRESSION STREAMS

(71) Applicant: Oracle International Corporation, Redwood Shores, CA (US)

(72) Inventors: Shrikumar Hariharasubrahmanian, Palo Alto, CA (US); Michael Delorimier, San Francisco, CA (US)

(73) Assignee: Oracle International Corporation, Redwood Shores, CA (US)

( * ) Notice: Subject to any disclaimer, the term of this patent is extended or adjusted under 35 U.S.C. 154(b) by 120 days.

(21) Appl. No.: 15/907,565

(22) Filed: Feb. 28, 2018

(65) Prior Publication Data

US 2019/0098064 A1 Mar. 28, 2019

Related U.S. Application Data

(60) Provisional application No. 62/563,489, filed on Sep. 26, 2017.

(51) Int. Cl.
*G06F 15/16* (2006.01)
*H04L 29/06* (2006.01)

(52) U.S. Cl.
CPC ............ *H04L 65/607* (2013.01); *H04L 69/04* (2013.01)

(58) Field of Classification Search
CPC .................................................... H04L 65/607
See application file for complete search history.

(56) References Cited

U.S. PATENT DOCUMENTS

| 9,477,731 | B2 | 10/2016 | Kornacker et al. |
| 10,210,585 | B2 | 2/2019 | Allbright |

(Continued)

FOREIGN PATENT DOCUMENTS

| CN | 102999660 B | 3/2013 |
| CN | 108319652 A | 7/2018 |

OTHER PUBLICATIONS

Ziv et al., "A Universal Algorithm for Sequential Data Compression", IEEE, vol. IT-23, No. 3, dated May 1977, 7 pages.

(Continued)

*Primary Examiner* — Kevin T Bates
*Assistant Examiner* — Clarence D McCray
(74) *Attorney, Agent, or Firm* — Hickman Palermo Becker Bingham LLP

(57) ABSTRACT

According to one or more embodiments, multiple related data streams are compressed jointly, such that substantive similarities between the multiple related streams are leveraged to reduce the overall size of the resulting compressed data. Specifically, given the compressed version of a primary data stream, a secondary data stream may be highly compressed by utilizing portions of the compressed version of the primary data stream to represent similar portions of the secondary data stream. A compression application is configured to receive (either concurrently or separately) information identifying multiple related input streams. For each input stream provided to the compression application, the application outputs one output stream. The computing system writes the output streams of the compression application to storage. Embodiments allow the size of the compressed version of a secondary data stream to be greatly reduced compared to the size of the stream compressed without reference to a primary data stream.

18 Claims, 6 Drawing Sheets

(56) References Cited

U.S. PATENT DOCUMENTS

| | | |
|---|---|---|
| 2014/0201244 A1 | 7/2014 | Zhou |
| 2014/0279960 A1 | 9/2014 | Marwah et al. |
| 2015/0381203 A1* | 12/2015 | Master .............. G06F 16/24561 341/67 |
| 2017/0193019 A1 | 7/2017 | Alsubaiee et al. |

OTHER PUBLICATIONS

Zheng et al., "Opaque: An Oblivious and Encrypted Distributed Analytics Platform", dated Mar. 2017, 17 pages.
Wikibooks, "Fundamentals of Information Systems Security/ Access Control Systems" last reviewed on May 30, 2019, 28 pages.
Twitter Blog, "Dremel Made Simple with Parquet", dated Sep. 11, 2013, 12 pages.
Seiler, Klaus, "Effective data exploration via columnar data formats like Parquet", last viewed on Oct. 18, 2019, 9 pages.
Papadimitriou et al., "Big Data Analytics over Encrypted Datasets with Seabed", dated 2016, 16 pages.
Melnik et al., "Dremel: Interactive Analysis of WebScale Datasets", Proceedings of the VLDB Endowment, vol. 3, No. 1 Copyright 2010, 10 pages.
Killourhy et al., "Toward Realistic and Artifact-Free Insider-Threat Data", 23rd Annual Computer Security Applications Conference, dated 2007, 10 pages.
Google Cloud, "Access control lists (ACLs)", https://cloud.google.com/storage/docs/access-control/lists, last viewed on Oct. 18, 2019, 13 pages.
GITHUB, "Parquet", https://github.com/apache/parquet-format/blob/f1de77d31936f4d50f1286676a0034b6339918ee/README.md, dated Oct. 16, 2017, 9 pages.
Gershinsky et al., "Efficient Spark Analytics on Encrypted Data", dated Jun. 2018, 30 pages.
Gaddam, Ajit, "Securing Your Big Data Environment", Black Hat USA dated 2015, 8 pages.
Dijcks, Jean-Pierre, "Just add Magic-Performance and Security in File Based Systems" dated Nov. 22, 2017, 8 pages.
Design Specification Enterprise Parquet, File Wire-Format v0.5, dated Sep. 27, 2018, 23 pages.
Amazon Simple Storage Service, "Access Control List (ACL) Overview", https://docs.aws.amazon.com/AmazonS3/latest/dev/acl-overview.html, last viewed on Oct. 18, 2019, 8 pages.
Amazon Athena, "Converting to Columnar Formats", https://docs.aws.amazon.com/athena/latest/ug/convert-to-columnar.html, last viewed on Oct. 18, 2019, 6 pages.

* cited by examiner

202 — DERIVE BOTH A FIRST SET OF LITERAL TOKENS AND A MASTER SET OF REFERENCES FROM A FIRST DATA STREAM, WHERE EACH REFERENCE OF THE MASTER SET OF REFERENCES REFERS TO A LITERAL TOKEN OF THE FIRST SET OF LITERAL TOKENS

204 — STORE A COMPRESSED VERSION OF THE FIRST DATA STREAM, WHERE THE COMPRESSED VERSION OF THE FIRST DATA STREAM COMPRISES THE FIRST SET OF LITERAL TOKENS AND THE MASTER SET OF REFERENCES

206 — DERIVE A SECOND SET OF LITERAL TOKENS FROM A SECOND DATA STREAM, WHERE EACH LITERAL TOKEN OF THE SECOND SET OF LITERAL TOKENS UNIQUELY CORRESPONDS TO A CORRESPONDING LITERAL TOKEN OF THE FIRST SET OF LITERAL TOKENS

208 — STORE A COMPRESSED VERSION OF THE SECOND DATA STREAM, WHERE THE COMPRESSED VERSION OF THE SECOND DATA STREAM COMPRISES THE SECOND SET OF LITERAL TOKENS

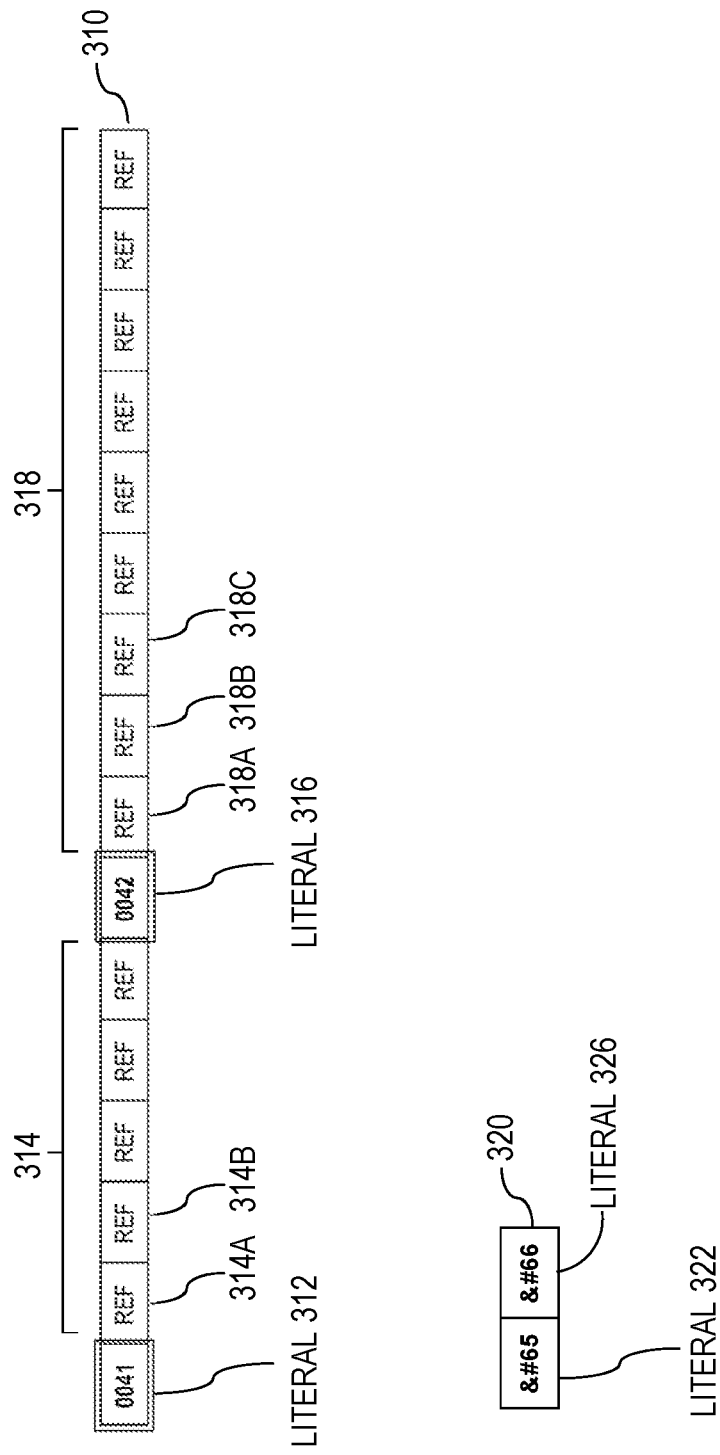

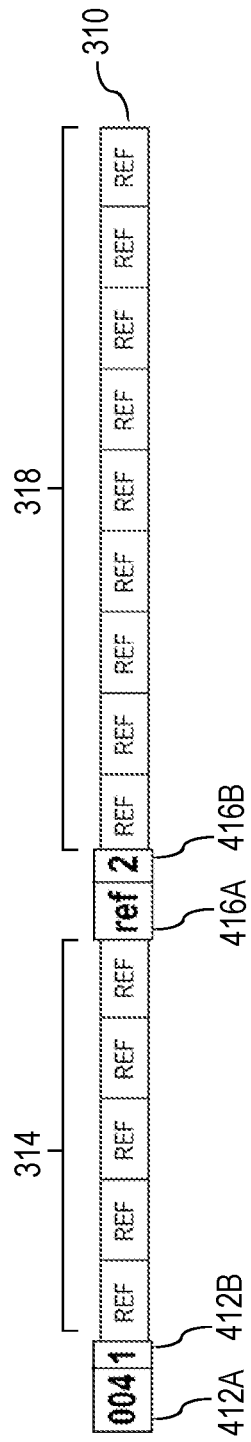

ENTROPY SHARING ACROSS MULTIPLE COMPRESSION STREAMS

BENEFIT CLAIM

This application claims the benefit under 35 U.S.C. § 119(e) of Provisional Appln. No. 62/563,489, titled "Entropy Sharing Across Multiple Concurrent Compression Streams", filed Sep. 26, 2017, the entire contents of which is hereby incorporated by reference as if fully set forth herein.

FIELD OF THE INVENTION

The present invention relates to compressing streams of data, and more specifically, to reducing the total compressed size of multiple related data streams by leveraging shared entropy among the related data streams.

BACKGROUND

A data stream, such as a data stream that represents an image, a video, a text document, a spreadsheet, etc., is an ordered sequence of data that can require a significant amount of space to store. A compression algorithm may be used to represent a data stream as a compressed version of the data stream. The compressed version of the data stream usually takes up less space than the uncompressed data stream, and may be used to recreate the original data stream, either with some loss of data or with no loss of data when compared to the original data stream.

Some compression algorithms, such as Snappy and GZip, are based on the Lempel-Ziv compression search algorithm. This search algorithm traverses a stream of data to be compressed, and identifies first instances of unique sequences of data (called literals). Many times, a compression application that implements a compression algorithm uses a history buffer to store a limited amount of the data stream to be compressed, and the identification of literals is based on the content of the history buffer. Literals are generally an arbitrary number of bytes, where the number of bytes is selected to optimize identification of matches within the history buffer.

A compression application uses these sequences of data to compress the data stream by assigning numerical representations to the literals and then representing repeated instances of the sequences, in a resulting compressed data stream, using the numerical representations (called references). Many times, the references are smaller to store than the literals that are being represented by the references.

Compression is generally invoked and performed separately for each data stream, with each invocation having no information about other compression invocations. Separate invocation is generally performed even when the data streams being compressed are related, i.e., differing in their actual contents, but representing the same or very similar substantive data. For example, a typical enterprise data processing application often contains many different applications and processes that work on the same data. These different applications utilize and/or produce different data stream formats that are optimized for use with the respective applications. To illustrate, for optimal performance of relational database management system (RDBMS) processing, the data being processed should be in RDBMS native formats. Further, analytics processing in a Big Data system, such as a Hadoop environment, might mandate binary encodings and ad-hoc queries might require textual representations. Thus, utilization of multiple data analytics systems on a single set of data often requires multiple formats of the same logical data to be physically materialized in storage.

It is usually not practicable to simply derive a given data stream from a different, but related, data stream because conversion algorithms can be computationally expensive and generally demand a full data stream read. Thus, when particular data is required to be stored in different encoded formats, the different data streams representing the particular data with different respective encodings are generally compressed and stored independently. Nevertheless, it would be beneficial to leverage similar information within multiple related data streams to reduce the overall size of the compressed versions of the related data streams.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

In the drawings:

FIG. 2 depicts a flowchart for compressing multiple related data streams.

FIG. 3 depicts output buffers storing compressed versions of multiple encodings of a given data stream.

FIG. 4 depicts an output buffer with literal items that represent sub-tokens.

DETAILED DESCRIPTION

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

General Overview

According to one or more embodiments, multiple related data streams are compressed jointly, such that substantive similarities between the multiple related streams are leveraged to reduce the overall size of the resulting compressed data. Specifically, given the compressed version of a primary data stream, a secondary data stream may be highly compressed by utilizing portions of the compressed version of the primary data stream to represent similar portions of the secondary data stream.

According to one or more embodiments, a compression application is configured to receive (either concurrently or separately) information identifying multiple related input streams. For example, an application running on a computing system receives input from a user that identifies multiple files that respectively represent multiple related data streams. Related data streams are data streams that have significant overlap in substantive content. For example, FIG.

1 depicts two files 110 and 120, both of which encode data sequence 102 with different encodings, i.e., file 110 encodes data sequence 102 with Unicode encoding and file 120 encodes data sequence 102 with HTML encoding. Files 110 and 120 are related because they both encode the same substantive data sequence 102.

Figure 1:
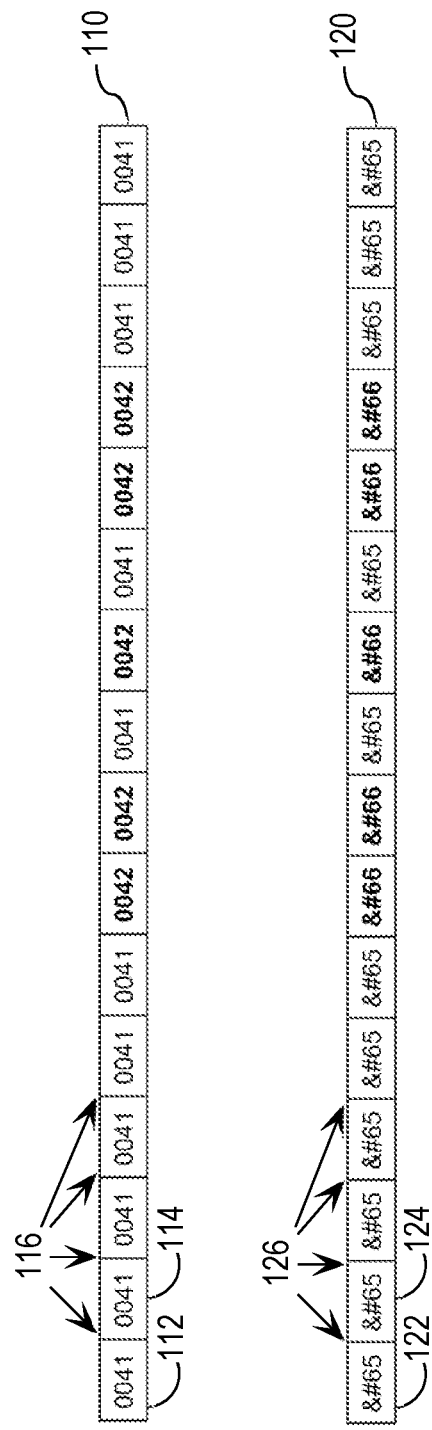
FIG. 1 depicts a data stream and multiple tokenized encodings of the data stream.

Related data streams may have differences, including the particular encodings of the data streams and/or the presence or absence of metadata and/or some quantity of different substantive data being represented by the related data streams. As such, FIG. 1 is an illustrative example, and according to one or more embodiments, data streams may be related even when there are differences in the substantive data sequence encoded by the data streams.

For each input stream provided to the compression application, the application outputs one output stream. The computing system writes the output streams of the compression application to storage. Embodiments allow the size of the compressed version of a secondary data stream to be greatly reduced compared to the size of the stream compressed without reference to a primary data stream.

Compression Application

FIG. 2 depicts a flowchart 200 for compressing multiple related data streams according to one or more embodiments. Specifically, according to one or more embodiments, a compression application compresses a first data stream at least in part by performing steps 202-204, and jointly compresses a second related data stream at least in part by performing steps 206-208. According to one or more embodiments, the first data stream and the second related data stream are compressed concurrently, as described in detail below. According to further embodiments, the first (primary) data stream is compressed partly or fully before compression of one or more secondary data streams in light of the compression performed for the primary data stream.

At step 202 of flowchart 200, both a first set of literal tokens and a master set of references are derived from a first data stream, where each reference of the master set of references refers to a literal token of the first set of literal tokens. For example, a compression application running on one or more computing devices applies a compression algorithm to a data stream (such as file 110 of FIG. 1) which produces a compressed version of the data stream comprising literals and references based on the original data stream.

Specifically, the compression application receives information, from a user, identifying at least a first data stream, e.g., depicted in FIG. 1 as file 110. The compression application identifies file 110 as a primary data stream, for example, based on the user identifying file 110 as the primary data stream within the compression application, or based on the user identifying file 110 before any other data stream related to file 110, etc.

According to an embodiment, a compression application includes all of the features attributed to a "compression application" described herein. According to another embodiment, a compression application includes one or more of the features attributed to a "compression application" described herein. An application, such as the compression application and the decompression application described herein, runs on a computing device and comprises a combination of software and allocation of resources from the computing device. Specifically, an application is a combination of integrated software components and an allocation of computational resources, such as memory, and/or processes on the computing device for executing the integrated software components on a processor, the combination of the software and computational resources being dedicated to performing the stated functions of the application.

Tokenizing a Data Stream

The compression application identifies, from file 110: (a) literal tokens within the data stream and (b) tokens that are repetitions of the literal tokens, which become references in the master set of references. As such, during the execution of the compression algorithm by the compression application, the compression application breaks the primary stream into tokens, where all substantive data from the primary stream is assigned, respectively, to a plurality of tokens, and searches for these tokens in a history buffer that the compression application maintains for the primary data stream.

A token is a chunk of data from a data stream. The compression application tokenizes a given data stream that is in a specific format using a tokenizer algorithm configured to tokenize the specific format. The format of a data stream is the manner in which the data is encoded within the data stream. There is a large number of encoding types, such as Unicode encoding, HTML character encoding, Parquet encoding, binary encoding, columnar encoding, etc. For example, the compression application selects a tokenizer algorithm to apply to file 110 based, at least in part, on the Unicode format of file 110 where the selected tokenizer algorithm is configured to tokenize Unicode-type data.

Furthermore, the compression application employs tokenizer algorithms that tokenize various formats of files similarly. When the compression application tokenizes two differently-encoded and related data streams similarly, then the compression application (a) applies a first tokenizer algorithm for the first data stream that puts, into a token for the first data stream, data representing particular substantive information; and (b) applies a second tokenizer algorithm for the second stream that puts, into a token for the second stream, data representing the same particular substantive information.

For example, for character-based substantive data, tokenizers put each character into its own token no matter the encoding of the characters in the stream being tokenized. As another example, in white-space-delimited substantive data, tokenizers put information between two given white spaces into its own token no matter the encoding of the stream being tokenized. A third example is counted strings, where the each token is headed by a number that is its length in bytes. In this third example, tokenizers put the number of bytes indicated by the header number into its own token without regard to the encoding of the stream being tokenized. Thus, the various tokenizer algorithms tokenize data streams similarly such that, given two streams that encode the same data, the parsers produce the same number of tokens from each stream, where each token from the streams corresponds to a logically-related token from the other stream.

Because related data streams are tokenized similarly, according to one or more embodiments, the compression application is able to compress the related data streams similarly as well, i.e., in lock-step. In other words, for data streams that encode the same data, the literals identified for the data streams will represent the same data, and as such, and the references for these data streams will be the exact same since the repeated occurrences of the identified literals in the data streams will be located in the same relative positions within the flows of the data streams.

Continuing with the discussion of step 202 of flowchart 200, the compression application utilizes the selected tokenizer algorithm, which is tailored to the format of file 110, to tokenize file 110 of FIG. 1. Specifically, the compression application assigns each Unicode character, represented within file 110, to its own token. In this manner, the compression application tokenizes file 110 according to the token boundaries 116 depicted within file 110 in FIG. 1. According to one or more embodiments depicted in FIG. 1, the data between two contiguous token boundaries 116 is assigned to a single token. Token boundaries 116, as depicted in FIG. 1, points to only four of the many token boundaries depicted in file 110 of FIG. 1.

Searching for Tokens within a History Buffer

As the compression application processes a given data stream, the compression application stores the last N tokens pulled from the data stream within a history buffer maintained for the data stream. The compression application maintains a distinct and separate history buffer for each data stream while the data stream is being compressed. The history data within each history buffer maintained by the compression application is token-delimited because the compression application not only records the substantive data from a data stream in its corresponding history buffer, but also information indicating the tokenization of the substantive data stored in the history buffer.

According to one or more embodiments, in order to identify literals and references within the primary data stream, the compression application searches for tokens, from the primary data stream, in a history buffer maintained by the compression application for the primary data stream. Specifically, the compression application searches for one or more given tokens from the primary data stream, within the history buffer maintained for the primary data stream, by comparing the one or more given tokens with the data in the history buffer in light of the token boundaries within the history buffer. According to one or more embodiments, the compression application only matches the one or more given tokens with one or more whole tokens within the history buffer. A whole token comprises all of the substantive data in the token with no data of the token omitted.

Searching based on whole tokens within a history buffer allows the compression application to avoid matches that are not aligned based on token boundaries. Specifically, matches from a history buffer that involve partial token values that cross token boundaries tend to be encoding-specific matches which can reduce the chances of the compression application maintaining lock-step compression among multiple related data streams. On the other hand, searching for matches based on whole tokens in the history buffer facilitates lock-step processing of the data streams.

Generating an Output Buffer for the Primary Data Stream

Continuing with the discussion of step 202 of flowchart 200, the compression application traverses file 110 to identify a set of literal tokens (as shown in literal items 312 and 316 of FIG. 3) and a master set of references to the literal tokens (as shown in reference items 314 and 318 of FIG. 3). As described herein, tokens are chunks of data from a data stream. An output stream for a data stream stores an ordered list of items that represent the ordered tokens from the data stream. Specifically, the output stream for the data stream comprises literal items that represent literal tokens from the data stream and reference items that represent repeated tokens from the data stream.

For every token extracted from the primary data stream, the compression application searches for a match in the primary history buffer. The matches found by these searches result in compressed data to be written out to an output buffer 310 (depicted in FIG. 3) that the compression application maintains for file 110. Specifically, each match that the compression application finds, within the history buffer for the primary data stream, for a token pulled from the primary data stream results in a reference item being emitted into output buffer 310, while every failed search for a given token (or "literal token") within the history buffer results in a literal item being emitted into output buffer 310.

In output buffer 310 depicted in FIG. 3, each literal item represents the whole content of at least one token from file 110, and each [REF] item stands for a history reference. In this simple example of an output buffer, output buffer 310 includes a literal item 312 (representing the literal token "0041", which is a single Unicode character pulled from file 110) and then a set of reference items 314, each of which refer to literal item 312 and represents a repeat occurrence of the token "0041" within file 110.

Furthermore, output buffer 310 includes, after the set of reference items 314, a second literal item 316 that represents the literal token "0042" (which is another single Unicode character) that has not occurred within file 110 previous to the position occupied by literal item 316. After literal item 316, output buffer 310 includes a set of reference items 318, each of which refers to either literal item 312 or literal item 316 and represents a repeat occurrence of the token represented by the literal item being referenced. Thus, output buffer 310 represents file 110 without loss of data, and may be used to recreate file 110 via a decompression algorithm.

With reference to the example of FIG. 3, the first set of literals referred to in step 202 is represented by literal items 312 and 316. Furthermore, the master set of references referred to in step 202 is represented by both of the sets of reference items 314 and 318 together.

At step 204 of flowchart 200 (FIG. 2), a compressed version of the first data stream is stored, where the compressed version of the first data stream comprises the first set of literal tokens and the master set of references. For example, the compression application causes output buffer 310 to be stored in non-transitory storage of one or more computing devices as the compressed version of file 110. According to one or more embodiments, step 204 need not be performed in the order indicated by flowchart 200.

References within a Compressed Representation of a Data Stream

According to one or more embodiments, a reference within output buffer 310 refers to a literal item within a history buffer maintained for file 110 based on a numerical value assigned to the literal item by the compression application. For example, all references within the set of reference items 314, including reference item 314A and reference item 314B, refer to literal item 312 as "0", which is the identifier assigned to literal item 312 by the compression application. This identifier may correspond to an index of an array or dictionary that the compression application uses to store the first set of literals. As a further example, reference items 318A and 318C within reference items 318 refer to literal item 316 as "1", which is the identifier assigned to literal item 316 by the compression application. As with reference items 314, reference item 318B refers to literal item 312 as "0".

Instead of using positions as a basis for locating literal items within an output buffer, literal items may be referenced based on byte offsets that indicate an offset from a current position in the history buffer, and value lengths. For example, a reference in output buffer 310 refers to a value that is X number of bytes that are offset from a current position in the history buffer maintained for file 110 and Y number of bytes long. This reference scheme is referred to as a byte offset. According to one or more embodiments, references utilize byte offsets to refer to whole tokens within the history buffer or output buffer (depending on the referencing scheme), i.e., by initiating the reference along token boundaries and by indicating a length for the value that encompasses the data for one or more contiguous whole tokens.

According to one or more embodiments, all references in a primary data stream refer to entire literal tokens from the primary data stream, and entire literal tokens from the secondary data streams, or integer multiple of entire literal tokens of the secondary data streams. In this way, the references of the primary data stream, even if expressed as byte offsets, can be easily translated into usable references or byte offsets of any given secondary data stream.

Compressing a Secondary Data Stream

Returning to flowchart 200 of FIG. 2, at step 206, a second set of literal tokens is derived from the second data stream, where each literal token of the second set of literal tokens uniquely corresponds to a corresponding literal token of the first set of literal tokens. For example, referring to FIG. 3, the compression application derives literal tokens shown in literal items 322 and 326 from secondary file 120. Since files 110 and 120 were tokenized similarly, literal item 322 corresponds to literal item 312 and literal item 326 corresponds to literal item 316. FIGS. 1 and 3 depict only two streams being compressed jointly. According to one or more embodiments, any number of related data streams may be jointly compressed by the compression application.

As described in further detail below, when the secondary data stream is related to the primary data stream, the compression application omits, from the output buffer of the secondary data stream, references for the secondary data stream that mirror references that are materialized in the compressed version of the primary data stream. In this way, the jointly-compressed version of the secondary data stream is much smaller than an independently-compressed version of the secondary data stream. Such a reduction in size allows the secondary data stream to be stored in a smaller amount of data, and allows for easier joint transmission of the primary and secondary data streams.

Tokenizing a Secondary Data Stream

In order to derive a second set of literal tokens from file 120, the compression application selects a tokenizer algorithm to apply to file 120 based, at least in part, on the format of file 120 (i.e., HTML encoding). The compression application then uses the selected tokenizer algorithm to tokenize file 120 similarly to the tokenization of file 110, which facilitates joint compression of the multiple related data streams in lock-step.

Thus, the compression application utilizes a second tokenizer algorithm, which is tailored to the encoding of file 120, to tokenize file 120 of FIG. 1. This second tokenizer algorithm assigns each HTML character code, represented within file 120, to its own token. In this manner, the compression application tokenizes file 120 according to the token boundaries 126 depicted within file 120 in FIG. 1. According to one or more embodiments depicted in FIG. 1, the data between two contiguous token boundaries 126 is assigned to a single token. As with token boundaries 116, token boundaries 126, as depicted in FIG. 1, points to only four of the many token boundaries depicted in file 120 of FIG. 1.

Processing the Secondary Data Stream in Lock-Step

As indicated above, the compression application performs compression on multiple related streams (e.g., file 110 and file 120) jointly in order to leverage information stored for the primary data stream to reduce the size of compressed versions of the secondary data streams. As such, the objective of the modified compression search algorithm is to discover the entropy that is shared between multiple related data streams. Since the compression application performs compression on one or more secondary data streams in light of the compression results of the primary data stream, the compression application can use the compressed version of the primary data stream to effectively compress the one or more secondary data streams.

According to one or more embodiments, tokenizing related data streams in lock-step comprises the compression application processing each token from the secondary data stream in light of the representation of a related token, from the primary data stream, in the output buffer for the primary data stream (inasmuch as the secondary data stream represents the same substantive information as the primary data stream). Processing a token comprises determining whether the token is a literal token to be represented as a literal item in the output buffer, or is to be represented by a reference item in the output buffer. The compression application maintains lock-step when the result of processing each token in the secondary data stream is the same as the result of processing the related token from the primary data stream, i.e., that both related tokens are either (a) literal tokens, or (b) represented in the respective output buffer by the same reference information (i.e., where the tokens are respective repeat occurrences of related literal items in the respective history buffers).

For example, the compression application pulls the first token 122 ("A") from file 120 and determines that token 122 is a literal token. As such, the compression application emits literal item 322 to output buffer 320 maintained by the compression application for file 120. Since the first token of output buffer 310 is also a literal token, then the processing of file 110 and file 120 is in lock-step. The compression application stores token 122 in a history buffer maintained for file 120.

Next, the compression application pulls the second token 124 ("A") from file 120 and searches the history buffer (for file 120) for token 124. Since the value of token 124 is the same as the value of token 122 stored in the history buffer, then the compression application determines the value of a reference item to represent token 124 within buffer 320. For example, the compression application determines that the value of a reference item to represent token 124 would be "0" to refer to the literal token in the 0th position within the history buffer for file 120.

The compression application compares the value of the reference item that was generated for token 124 to the value of the next item in buffer 310, i.e., reference item 314A (which represents token 114 from file 110 that corresponds to token 124 in file 120). The compression application determines that the compression of file 120 is still in lock-step with the compression of primary file 110 since the value of reference item 314A is "0" to refer to the literal token in the 0th position within the history buffer, which is the same as the value of the reference item determined for token 124.

Since the compression of file 120 is in lock-step with the compression of file 110 with respect to token 124, the compression application skips emitting the reference item for token 124 into output buffer 320. The reference item for token 124 is not needed since the same information is recorded within output buffer 310. Instead, according to one or more embodiments, the compression application records, in metadata for file 120 referred to herein as decompression information, that the item to represent token 124 is located within output buffer 310, i.e., at position 314A. This decompression information may be represented in many ways, and is discussed in further detail below.

If the compression application pulls a token from a secondary data stream that does not relate to (i.e., have the same substantive data as) the corresponding token from the primary data stream, then the compression application detects this break from lock-step by determining that (a) unlike the corresponding token from the primary data stream, the token from the secondary data stream is a literal token; or (b) the reference item value determined for the token from the secondary data stream is not the same as the value of the reference item that represents the corresponding token from the primary data stream. When lock-step is lost, the compression application stores the item that represents the token from the secondary data stream in the output buffer for the secondary data stream. Further, according to one or more embodiments, since lock-step has been lost, the compression application continues on with compressing the secondary data stream without regard to the primary data stream.

Returning to flowchart 200 of FIG. 2, at step 208, a compressed version of the second data stream is stored, where the compressed version of the second data stream comprises the second set of literal tokens. For example, the compression application stores, on non-transitory storage of a computing device, output buffer 320, which comprises literal items 322 and 326 representing literal tokens from file 120, as the compressed version of file 120.

Notably, output buffer 320 does not include references because decompression of the compressed version of file 120 relies on the master reference set recorded within the stored version of output buffer 310 for the primary data stream. Because the requirement to store references for the secondary file is greatly reduced, or even eliminated, the amount of space required to store output buffer 320 is significantly reduced compared to the size of a compressed version of file 120 that is performed without the benefit of joint compression with a related primary file.

Thus, embodiments employ a modification to the Lempel-Ziv algorithm that allows the entropy shared between multiple data streams containing different representations of logically similar data to be discovered. By applying the joint compression algorithm implemented by the compression application to a primary data stream and also to all secondary data streams that the user inputs to the compression application, the compression application is able to leverage, in producing compressed representations of the primary and secondary data streams, portions of information that the primary data stream has in common with the secondary data streams while preserving, within the compressed representations of the data streams, those portions of the information in each data stream that is peculiar to the respective data stream and therefore different.

For logically-related data streams that are inherently highly compressible with the Lempel-Ziv algorithm, the portion of the compressed representations of the related streams that is common to all compressed representations is typically large, and the portion of the compressed streams that is unique to each compressed representation is small. A portion of a plurality of logically-related and compressed streams that is common to all of the data stream representations is the portion of data in one representation that is either literally or logically the same as a corresponding portion of data in another representation. Specifically, portions of data streams comprising different literal data are still common to the data stream representations when the data has the same converted meaning, or derivable meaning, (i.e., the data is substantively the same) and there exists some algorithm or method such that one portion of data from one representation can be derived from the corresponding portion of data from another representation.

When all of the common and unique components of the related data stream representations are wrapped up into a single composite compressed representation, this composite compressed representation is typically not much bigger than a compressed representation of the primary data stream by itself. In fact, there is an increase in size of the composite compressed representation over the compressed representation of the primary data stream by itself due to the difference between the representations, namely the entropy that is not shared. Thus, in cases where the multiple data streams being jointly compressed represent substantially the same data, the compressed representation of these related data streams, resulting from embodiments, is on the order of 1× compared to the compressed representation of the primary data stream by itself.

Sub-Token Matching

According to one or more embodiments, the compression ratio of individual data streams may be improved by representing sub-tokens (where a sub-token is a less-than-whole portion of a token identified by the compression application) in the compressed version of a data stream using references that are specific to the individual data stream. For example, the compression application searches, in the history buffer maintained for a given data stream, for a sub-string of a source token from a data stream. According to one or more embodiments, as with the whole token search described above, substrings of tokens are compared to substrings of other tokens, where the substrings do not cross token boundaries.

If a match for the sub-string is found within the history buffer, the compression application represents, within the output buffer of the data stream, the found token that includes the match for the sub-string with at least two sub-tokens where one of the sub-tokens stores only the matching sub-string. The compression application further represents, within the output buffer of the data stream, the source token as one or more sub-tokens that includes one reference sub-token that refers to the sub-token of the matching literal sub-token within the history buffer. Breaking literal tokens, from a data stream, into sub-tokens allows for symbolic representation of the sub-tokens, which facilitates further compression of the data stream.

To illustrate in the context of FIGS. 3 and 4, the compression application determines that literal item 316 includes the substring "004", which is also within literal item 312. As a result, the compression application breaks the literal token "0041" represented by literal item 312 into two sub-tokens represented, in FIG. 4, by sub-token items 412A and 412B. Sub-token item 412A represents the common sub-string "004" and sub-token item 412B represents the substring from literal item 312 that is not included in the matching sub-string, i.e., "1". Also, the compression application breaks the literal token "0042" represented by literal item 316 into two sub-tokens represented, in FIG. 4, by sub-token items 416A and 416B. Sub-token item 416A comprises a reference to sub-token item 412A, and sub-token item 416B represents the substring in literal item 316 that is not included in the matching sub-string, i.e., "2".

Breaking a literal item into sub-token items does not affect the correspondence of the literal item (now a plurality of sub-token items) with corresponding items in other data streams. For example, in the context of FIG. 4, the two sub-token items 412A and 412B correspond, collectively, to literal item 322 of output buffer 320. If compression application were to break literal item 322 into multiple sub-token items, then the two sub-token items 412A and 412B would correspond, collectively, to all of the multiple sub-tokens into which literal item 322 would be broken.

Decompression of Jointly Compressed Files

Since the compressed version of the primary data stream includes all literals and references for the data stream, the primary data stream is using only information stored for the primary data stream. However, since the compressed version of a secondary stream only includes the delta over the compressed version of the primary data stream, a secondary data stream is decompressed using both the compressed primary stream and the compressed secondary stream. Thus, a decompression application running on a computing device decompresses a given secondary stream by walking through both the primary output stream and the secondary output stream so as to have access to the information in the primary stream that pertains to the secondary stream (where an output stream is a stored compressed version of a data stream). According to one or more embodiments, the decompression application is distinct from the compression application or is part of the same application as the compression application.

In order to recreate the content of the secondary data stream using information from the primary output stream, for every literal item encountered in the primary output stream, the decompression application substitutes the literal item from the primary output stream with a corresponding literal item from the secondary output stream. On the other hand, for every reference item in the primary output stream, the decompression application consumes and uses it as if part of the secondary output stream, i.e., as a reference to data in the history buffer populated based on literals in the secondary output stream (rather than based on literals in the primary output stream). The result of this process is a decompression of the secondary data stream to recreate the original secondary data stream instead of the original primary data stream.

Furthermore, since data for a secondary data stream is effectively stored in two different places (i.e., in the primary output stream and in the secondary output stream), during compression of the streams, the compression application stores metadata for the secondary data stream, called "decompression information" herein, that indicates how to recreate each token of the secondary data stream. The decompression application is configured to determine what portions of the primary output stream to use in decompressing the secondary output stream based on the decompression information.

According to one or more embodiments, decompression information for a given secondary output stream indicates a first number of items, at any point along the ordered set of items from the secondary output stream, that correspond to a corresponding second number of items from the primary output stream. As indicated above, to decompress a given secondary output stream, the decompression application walks through both the primary output stream and the secondary output stream. Using the decompression information, the decompression application knows how many items stored in the primary output stream correspond to the items stored in the secondary output stream.

For example, in the context of FIG. 3, the decompression application utilizes the output stream created from output buffer 320 in order to decompress this data stream. Thus, output buffer 320 has been saved to disk as an output stream, which is referred to herein as output stream 320'. Also, output buffer 310 has been saved to disk as an output stream, which is referred to herein as output stream 310'. Output stream 320' and output stream 310' store the same information depicted in FIG. 3 for output buffers 320 and 310, respectively.

In this example, the decompression application determines, from decompression information for output stream 320', that a first output group from output stream 320' comprises the first token of output stream 320' (i.e., literal item 322). The decompression information indicates that the first output group from output stream 320' corresponds to a second output group from output stream 310' that comprises the first six tokens of output stream 310' (i.e., literal item 312 and all of reference items 314). The output group for output stream 320' includes a single literal (i.e., literal item 322) and the correlated output group for output stream 310' includes a single literal (i.e., literal item 312). As such, the decompression application populates the history buffer for output stream '320 with the value of literal item 322 and steps through the references in reference items 314 based on the history buffer storing the value of literal item 322 in place of literal item 312. In other words, the decompression application uses literal item 322 in place of literal item 312 in stepping through decompression of output stream 320' as required by reference items 314. In this way, the reference items 314 are interpreted as referring to literal item 322 and not to literal item 312 in the context of output stream 320'.

Continuing with this example, the decompression application determines, from the decompression information for output stream 320', that a third output group from output stream 320' comprises the second token of output stream 320' (i.e., literal item 326). The decompression information further indicates that the third output group from output stream 320' corresponds to a fourth output group from output stream 310' that comprises the next ten tokens of output stream 310' (i.e., literal item 316 and all of reference items 318). Since the third output group from output stream 320' includes a single literal (i.e., literal item 326) and the correlated output group for output stream 310' includes a single literal (i.e., literal item 316), the decompression application further populates the history buffer with the value of literal item 326 and steps through the references in reference items 318 with literal item 326 in place of literal item 316 as described above.

Since the history buffer is already populated with the value of literal item 322 in place of literal item 312, any references in reference items 318 that would have referred to literal item 312 in the context of the primary data stream will continue to be interpreted by the decompression application as referring to literal item 322. In other words, the decompression application uses literal item 322 in place of literal item 312 and uses literal item 326 in place of literal item 316 in stepping through decompression of the file as required by reference items 318. In this way, the reference items 318 are interpreted as referring to literal items 322 and 326 and not to literal items 312 and 316.

In this way, the decompression application recreates the original data from the secondary data stream of file 120 based, in part, on data stored for file 110.

Data Stream Metadata

Data streams may be associated with metadata (not depicted in FIG. 1). The metadata comprises tokens, which describe aspects of the data for the data stream, such as field widths, indices, counts, and validity qualifiers. The metadata for a particular data stream may be partly or wholly generated after receipt of the data stream, according to one or more embodiments, or may be provided with the data stream. Embodiments advantageously use such metadata during performance of the search steps required by the compression algorithm. For example, metadata can be used to verify version numbers, check for data corruption, verify that the correct primary data stream is used to decompress a given secondary data stream, identify size buffers used by the decompression algorithm, enable filtering queries, enable counting of queries, etc. As such, according to one or more embodiments, a metadata sub-stream of a given data stream is held auxiliary to the main data sub-stream and there is one metadata sub-stream which is paired with each data sub-stream.

Entropy

Entropy in a data stream is a measure of the unpredictableness of the data in the data stream. For example, a data stream that is full of one value, say zero, has very little entropy. In the case of such a data stream, the entire data stream can be represented by a single zero followed by a count of the number of required zeros.

This is the essence of compression, where the unpredictability of the data stream is captured in the literals and references of the output stream. The portion of an original data stream, no matter how many megabytes or terabytes it might be, that is deemed to have no unpredictability (or entropy) can be recreated on demand and does not need to be stored. Compression is thus the process of identifying the entropy, or unpredictability, in a data stream and storing just that which is unpredictable and as little more than that as possible.

More specifically, in the example output buffer 310 of FIG. 3, the entropy in the data stream is represented by the stream of literals and references. As can be seen from FIG. 3, the literals in output buffer 310 and output buffer 320 differ since the characters are being represented differently in the two different encodings of data sequence 102 of FIG. 1.

However, in the example of FIGS. 1 and 3, for every literal in one representation of data sequence 102, there is a strictly corresponding literal in the other representation of the same data. As such, the literals between file 110 and file 120 differ, but the references between the two streams are exactly the same.

According to one or more embodiments, the literals in output buffers 310 and 320 represent the entropy in the data that is not shared with the other representation. The references in the output streams represent the entropy in the data that is in fact shared with the other data stream representation.

Hardware Overview

According to one embodiment, the techniques described herein, including the compression application described in connection with FIG. 2 and other concepts herein, are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 5:
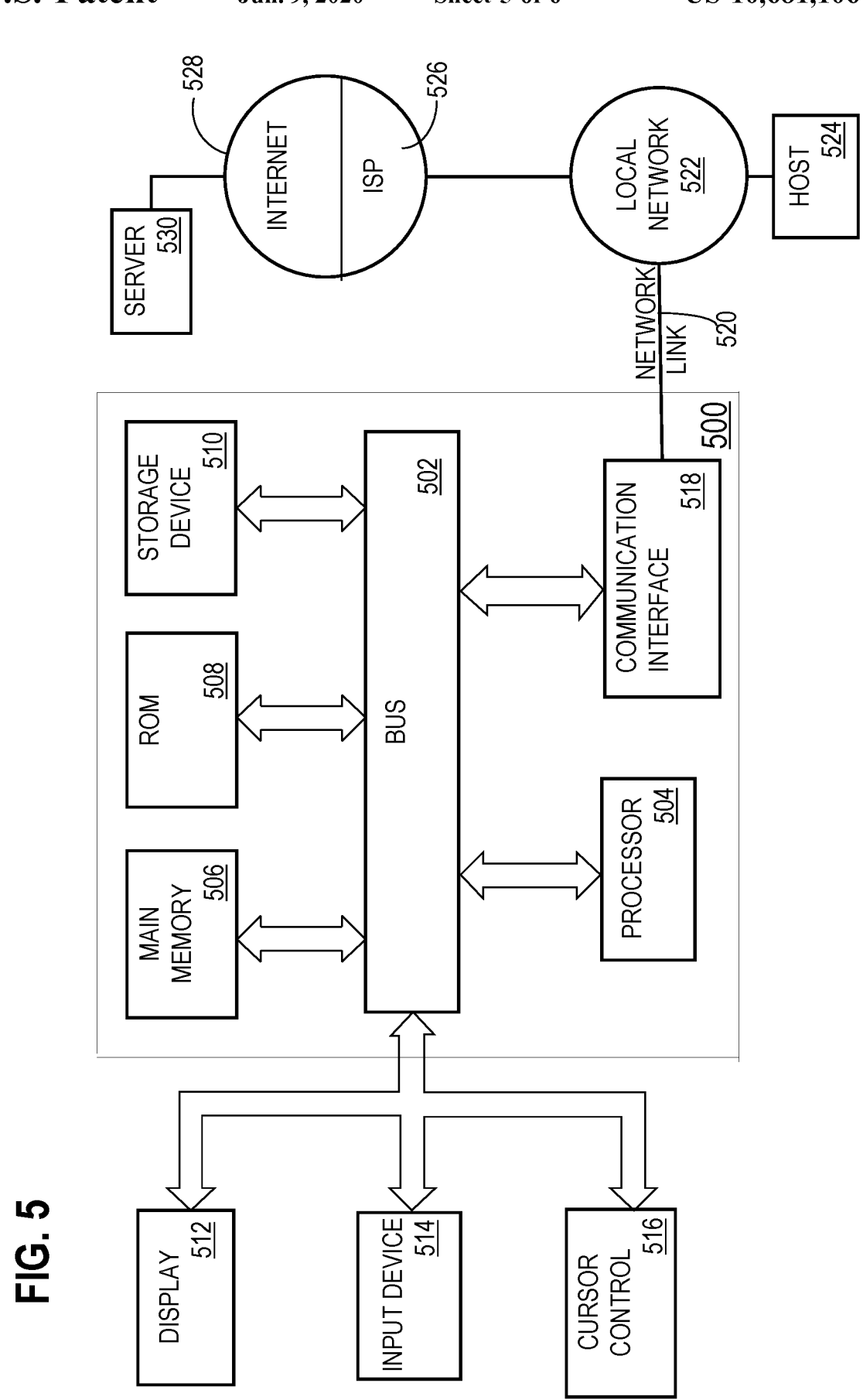
FIG. 5 is a block diagram of a computer system on which embodiments may be implemented.

For example, FIG. 5 is a block diagram that illustrates a computer system 500 upon which an embodiment of the invention may be implemented. Computer system 500 includes a bus 502 or other communication mechanism for communicating information, and a hardware processor 504 coupled with bus 502 for processing information. Hardware processor 504 may be, for example, a general purpose microprocessor.

Computer system 500 also includes a main memory 506, such as a random access memory (RAM) or other dynamic storage device, coupled to bus 502 for storing information and instructions to be executed by processor 504. Main memory 506 also may be used for storing temporary variables or other intermediate information during execution of instructions to be executed by processor 504. Such instructions, when stored in non-transitory storage media accessible to processor 504, render computer system 500 into a special-purpose machine that is customized to perform the operations specified in the instructions.

Computer system 500 further includes a read only memory (ROM) 508 or other static storage device coupled to bus 502 for storing static information and instructions for processor 504. A storage device 510, such as a magnetic disk, optical disk, or solid-state drive is provided and coupled to bus 502 for storing information and instructions.

Computer system 500 may be coupled via bus 502 to a display 512, such as a cathode ray tube (CRT), for displaying information to a computer user. An input device 514, including alphanumeric and other keys, is coupled to bus 502 for communicating information and command selections to processor 504. Another type of user input device is cursor control 516, such as a mouse, a trackball, or cursor direction keys for communicating direction information and command selections to processor 504 and for controlling cursor movement on display 512. This input device typically has two degrees of freedom in two axes, a first axis (e.g., x) and a second axis (e.g., y), that allows the device to specify positions in a plane.

Computer system 500 may implement the techniques described herein using customized hard-wired logic, one or more ASICs or FPGAs, firmware and/or program logic which in combination with the computer system causes or programs computer system 500 to be a special-purpose machine. According to one embodiment, the techniques herein are performed by computer system 500 in response to processor 504 executing one or more sequences of one or more instructions contained in main memory 506. Such instructions may be read into main memory 506 from another storage medium, such as storage device 510. Execution of the sequences of instructions contained in main memory 506 causes processor 504 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical disks, magnetic disks, or solid-state drives, such as storage device 510. Volatile media includes dynamic memory, such as main memory 506. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 502. Transmission media can also take the form of acoustic or light waves, such as those generated during radio-wave and infra-red data communications.

Various forms of media may be involved in carrying one or more sequences of one or more instructions to processor 504 for execution. For example, the instructions may initially be carried on a magnetic disk or solid-state drive of a remote computer. The remote computer can load the instructions into its dynamic memory and send the instructions over a telephone line using a modem. A modem local to computer system 500 can receive the data on the telephone line and use an infra-red transmitter to convert the data to an infra-red signal. An infra-red detector can receive the data carried in the infra-red signal and appropriate circuitry can place the data on bus 502. Bus 502 carries the data to main memory 506, from which processor 504 retrieves and executes the instructions. The instructions received by main memory 506 may optionally be stored on storage device 510 either before or after execution by processor 504.

Computer system 500 also includes a communication interface 518 coupled to bus 502. Communication interface 518 provides a two-way data communication coupling to a network link 520 that is connected to a local network 522. For example, communication interface 518 may be an integrated services digital network (ISDN) card, cable modem, satellite modem, or a modem to provide a data communication connection to a corresponding type of telephone line. As another example, communication interface 518 may be a local area network (LAN) card to provide a data communication connection to a compatible LAN. Wireless links may also be implemented. In any such implementation, communication interface 518 sends and receives electrical, electromagnetic or optical signals that carry digital data streams representing various types of information.

Network link 520 typically provides data communication through one or more networks to other data devices. For example, network link 520 may provide a connection through local network 522 to a host computer 524 or to data equipment operated by an Internet Service Provider (ISP) 526. ISP 526 in turn provides data communication services through the world wide packet data communication network now commonly referred to as the "Internet" 528. Local network 522 and Internet 528 both use electrical, electromagnetic or optical signals that carry digital data streams. The signals through the various networks and the signals on network link 520 and through communication interface 518, which carry the digital data to and from computer system 500, are example forms of transmission media.

Computer system 500 can send messages and receive data, including program code, through the network(s), network link 520 and communication interface 518. In the Internet example, a server 530 might transmit a requested code for an application program through Internet 528, ISP 526, local network 522 and communication interface 518.

The received code may be executed by processor 504 as it is received, and/or stored in storage device 510, or other non-volatile storage for later execution.

Software Overview

Figure 6:
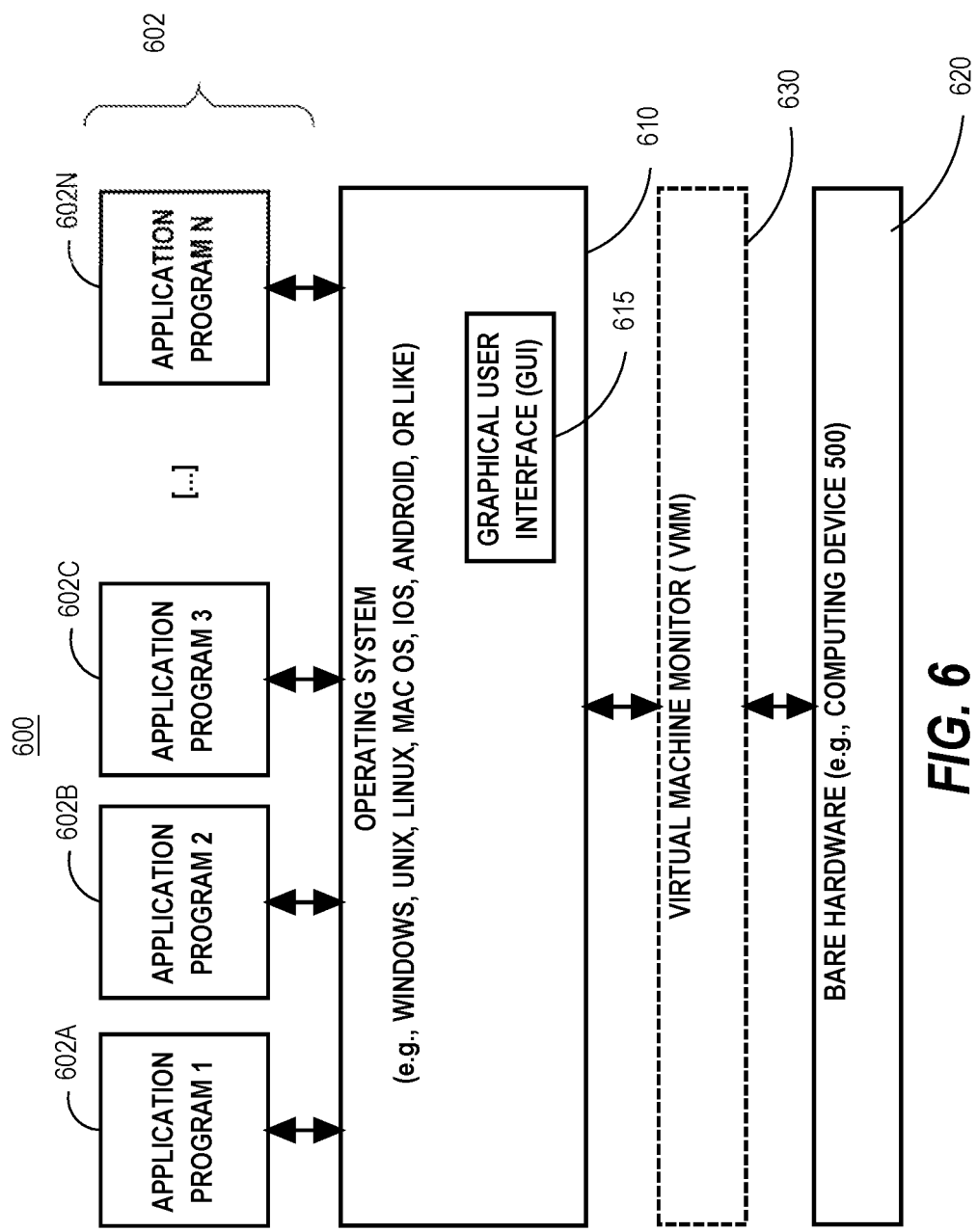
FIG. 6 is a block diagram of a basic software system that may be employed for controlling the operation of a computer system.

FIG. 6 is a block diagram of a basic software system 600 that may be employed for controlling the operation of computer system 500. Software system 600 and its components, including their connections, relationships, and functions, is meant to be exemplary only, and not meant to limit implementations of the example embodiment(s). Other software systems suitable for implementing the example embodiment(s) may have different components, including components with different connections, relationships, and functions.

Software system 600 is provided for directing the operation of computer system 500. Software system 600, which may be stored in system memory (RAM) 506 and on fixed storage (e.g., hard disk or flash memory) 510, includes a kernel or operating system (OS) 610.

The OS 610 manages low-level aspects of computer operation, including managing execution of processes, memory allocation, data stream input and output (I/O), and device I/O. One or more application programs, represented as 602A, 602B, 602C . . . 602N, may be "loaded" (e.g., transferred from fixed storage 510 into memory 506) for execution by the system 600. The applications or other software intended for use on computer system 500 may also be stored as a set of downloadable computer-executable instructions, for example, for downloading and installation from an Internet location (e.g., a Web server, an app store, or other online service).

Software system 600 includes a graphical user interface (GUI) 615, for receiving user commands and data in a graphical (e.g., "point-and-click" or "touch gesture") fashion. These inputs, in turn, may be acted upon by the system 600 in accordance with instructions from operating system 610 and/or application(s) 602. The GUI 615 also serves to display the results of operation from the OS 610 and application(s) 602, whereupon the user may supply additional inputs or terminate the session (e.g., log off).

OS 610 can execute directly on the bare hardware 620 (e.g., processor(s) 504) of computer system 500. Alternatively, a hypervisor or virtual machine monitor (VMM) 630 may be interposed between the bare hardware 620 and the OS 610. In this configuration, VMM 630 acts as a software "cushion" or virtualization layer between the OS 610 and the bare hardware 620 of the computer system 500.

VMM 630 instantiates and runs one or more virtual machine instances ("guest machines"). Each guest machine comprises a "guest" operating system, such as OS 610, and one or more applications, such as application(s) 602, designed to execute on the guest operating system. The VMM 630 presents the guest operating systems with a virtual operating platform and manages the execution of the guest operating systems.

In some instances, the VMM 630 may allow a guest operating system to run as if it is running on the bare hardware 620 of computer system 500 directly. In these instances, the same version of the guest operating system configured to execute on the bare hardware 620 directly may also execute on VMM 630 without modification or reconfiguration. In other words, VMM 630 may provide full hardware and CPU virtualization to a guest operating system in some instances.

In other instances, a guest operating system may be specially designed or configured to execute on VMM 630 for efficiency. In these instances, the guest operating system is "aware" that it executes on a virtual machine monitor. In other words, VMM 630 may provide para-virtualization to a guest operating system in some instances.

A computer system process comprises an allotment of hardware processor time, and an allotment of memory (physical and/or virtual), the allotment of memory being for storing instructions executed by the hardware processor, for storing data generated by the hardware processor executing the instructions, and/or for storing the hardware processor state (e.g. content of registers) between allotments of the hardware processor time when the computer system process is not running. Computer system processes run under the control of an operating system, and may run under the control of other programs being executed on the computer system.

Cloud Computing

The term "cloud computing" is generally used herein to describe a computing model which enables on-demand access to a shared pool of computing resources, such as computer networks, servers, software applications, and services, and which allows for rapid provisioning and release of resources with minimal management effort or service provider interaction.

A cloud computing environment (sometimes referred to as a cloud environment, or a cloud) can be implemented in a variety of different ways to best suit different requirements. For example, in a public cloud environment, the underlying computing infrastructure is owned by an organization that makes its cloud services available to other organizations or to the general public. In contrast, a private cloud environment is generally intended solely for use by, or within, a single organization. A community cloud is intended to be shared by several organizations within a community; while a hybrid cloud comprises two or more types of cloud (e.g., private, community, or public) that are bound together by data and application portability.

Generally, a cloud computing model enables some of those responsibilities which previously may have been provided by an organization's own information technology department, to instead be delivered as service layers within a cloud environment, for use by consumers (either within or external to the organization, according to the cloud's public/private nature). Depending on the particular implementation, the precise definition of components or features provided by or within each cloud service layer can vary, but common examples include: Software as a Service (SaaS), in which consumers use software applications that are running upon a cloud infrastructure, while a SaaS provider manages or controls the underlying cloud infrastructure and applications. Platform as a Service (PaaS), in which consumers can use software programming languages and development tools supported by a PaaS provider to develop, deploy, and otherwise control their own applications, while the PaaS provider manages or controls other aspects of the cloud environment (i.e., everything below the run-time execution environment). Infrastructure as a Service (IaaS), in which consumers can deploy and run arbitrary software applications, and/or provision processing, storage, networks, and other fundamental computing resources, while an IaaS provider manages or controls the underlying physical cloud infrastructure (i.e., everything below the operating system layer). Database as a Service (DBaaS) in which consumers use a database server or Database Management System that is running upon a cloud infrastructure, while a DBaaS provider manages or controls the underlying cloud infrastructure, applications, and servers, including one or more database servers.

The above-described basic computer hardware and software and cloud computing environment presented for purpose of illustrating the basic underlying computer components that may be employed for implementing the example embodiment(s). The example embodiment(s), however, are not necessarily limited to any particular computing environment or computing device configuration. Instead, the example embodiment(s) may be implemented in any type of system architecture or processing environment that one skilled in the art, in light of this disclosure, would understand as capable of supporting the features and functions of the example embodiment(s) presented herein.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A computer-implemented method comprising:
   compressing a first data stream at least in part by:
     deriving both a first set of literal tokens and a master set of references from the first data stream,
     wherein each reference of the master set of references refers to a literal token of the first set of literal tokens, and
     storing a compressed version of the first data stream, wherein the compressed version of the first data stream comprises the first set of literal tokens and the master set of references;
   compressing a second data stream at least in part by:
     deriving a second set of literal tokens from the second data stream,
     wherein each literal token of the second set of literal tokens uniquely corresponds to a corresponding literal token of the first set of literal tokens,
     storing a compressed version of the second data stream, wherein the compressed version of the second data stream comprises the second set of literal tokens, and
     storing metadata, for the compressed version of the second data stream, that refers to at least a portion of the master set of references;
   wherein the first data stream is distinct from the second data stream;
   wherein at least a portion of the first data stream encodes the same substantive content as at least a portion of the second data stream; and
   wherein the method is performed by one or more computing devices.

2. The method of claim 1, wherein compressing the first data stream and compressing the second data stream is performed concurrently.

3. The method of claim 1, further comprising:
   identifying a particular token from the second data stream that corresponds to a corresponding token from the first data stream;
   identifying, for the second data stream, first one or more references that refer to the particular token;
   determining that the master set of references includes corresponding second one or more references that refer to the corresponding token from the first data stream;
   wherein the first one or more references have the same respective values as the corresponding second one or more references;

in response to determining that the master set of references includes the corresponding second one or more references that refer to the corresponding token from the first data stream, omitting, from an output buffer for the second data stream, the first one or more references.

4. The method of claim 1, wherein each reference of the master set of references refers to a position of a literal token of the first set of literal tokens.

5. The method of claim 1, wherein the first data stream and the second data stream are related data streams.

6. The method of claim 1, wherein:
deriving the first set of literal tokens comprises tokenizing the first data stream;
deriving the second set of literal tokens comprises tokenizing the second data stream;
tokenizing the first data stream and tokenizing the second data stream results in similar data, from the first data stream and the second data stream, being tokenized similarly.

7. The method of claim 6, wherein compressing the first data stream further comprises:
searching, within a first history buffer for the first data stream, for one or more tokens from the first data stream;
wherein the first history buffer stores history data that is at least partially tokenized;
identifying a particular reference, of the master set of references, based on finding particular content of the one or more tokens in the first history buffer represented as one or more whole tokens within the history data stored in the first history buffer.

8. The method of claim 1, wherein storing the compressed version of the first data stream further comprises:
storing a first token of the first set of literal tokens as a plurality of sub-tokens;
wherein a particular sub-token of the plurality of sub-tokens is represented by a reference to at least a portion of a second literal token of the first set of literal tokens.

9. The method of claim 1, wherein deriving the master set of references from the first data stream comprises:
determining that particular content of a particular token, from the first data stream, occurs within a history buffer maintained for the first data stream;
wherein the particular content of the particular token includes all content of the particular token;
determining whether the particular content, within the history buffer maintained for the first data stream, is represented as one or more whole tokens;
in response to determining that the particular content is represented as one or more whole tokens within the history buffer, outputting a particular reference to represent the particular token in an output buffer for the first data stream;
wherein the particular reference refers to the one or more whole tokens.

10. One or more non-transitory computer-readable media storing instructions that, when executed by one or more processors, cause:
compressing a first data stream at least in part by:
deriving both a first set of literal tokens and a master set of references from the first data stream,
wherein each reference of the master set of references refers to a literal token of the first set of literal tokens, and
storing a compressed version of the first data stream, wherein the compressed version of the first data stream comprises the first set of literal tokens and the master set of references;
compressing a second data stream at least in part by:
deriving a second set of literal tokens from the second data stream,
wherein each literal token of the second set of literal tokens uniquely corresponds to a corresponding literal token of the first set of literal tokens, and
storing a compressed version of the second data stream, wherein the compressed version of the second data stream comprises the second set of literal tokens, and
storing metadata, for the compressed version of the second data stream, that refers to at least a portion of the master set of references
wherein the first data stream is distinct from the second data stream; and
wherein at least a portion of the first data stream encodes the same substantive content as at least a portion of the second data stream.

11. The one or more non-transitory computer-readable media of claim 10, wherein compressing the first data stream and compressing the second data stream is performed concurrently.

12. The one or more non-transitory computer-readable media of claim 10, wherein the instructions further comprise instructions that, when executed by one or more processors, cause:
identifying a particular token from the second data stream that corresponds to a corresponding token from the first data stream;
identifying, for the second data stream, first one or more references that refer to the particular token;
determining that the master set of references includes corresponding second one or more references that refer to the corresponding token from the first data stream;
wherein the first one or more references have the same respective values as the corresponding second one or more references;
in response to determining that the master set of references includes the corresponding second one or more references that refer to the corresponding token from the first data stream, omitting, from an output buffer for the second data stream, the first one or more references.

13. The one or more non-transitory computer-readable media of claim 10, wherein each reference of the master set of references refers to a position of a literal token of the first set of literal tokens.

14. The one or more non-transitory computer-readable media of claim 10, wherein the first data stream and the second data stream are related data streams.

15. The one or more non-transitory computer-readable media of claim 10, wherein:
deriving the first set of literal tokens comprises tokenizing the first data stream;
deriving the second set of literal tokens comprises tokenizing the second data stream;
tokenizing the first data stream and tokenizing the second data stream results in similar data, from the first data stream and the second data stream, being tokenized similarly.

16. The one or more non-transitory computer-readable media of claim 15, wherein compressing the first data stream further comprises:

searching, within a first history buffer for the first data stream, for one or more tokens from the first data stream;

wherein the first history buffer stores history data that is at least partially tokenized;

identifying a particular reference, of the master set of references, based on finding particular content of the one or more tokens in the first history buffer represented as one or more whole tokens within the history data stored in the first history buffer.

17. The one or more non-transitory computer-readable media of claim 10, wherein storing the compressed version of the first data stream further comprises:

storing a first token of the first set of literal tokens as a plurality of sub-tokens;

wherein a particular sub-token of the plurality of sub-tokens is represented by a reference to at least a portion of a second literal token of the first set of literal tokens.

18. The one or more non-transitory computer-readable media of claim 10, wherein deriving the master set of references from the first data stream comprises:

determining that particular content of a particular token, from the first data stream, occurs within a history buffer maintained for the first data stream;

wherein the particular content of the particular token includes all content of the particular token;

determining whether the particular content, within the history buffer maintained for the first data stream, is represented as one or more whole tokens;

in response to determining that the particular content is represented as one or more whole tokens within the history buffer, outputting a particular reference to represent the particular token in an output buffer for the first data stream;

wherein the particular reference refers to the one or more whole tokens.

\* \* \* \* \*